(12) United States Patent
Schulte et al.

(10) Patent No.: US 9,188,507 B2
(45) Date of Patent: Nov. 17, 2015

(54) SYSTEMS AND METHODS FOR TESTING A STEERING CONTROL UNIT INCLUDING A TEST STAND

(75) Inventors: Thomas Schulte, Oerlinghausen (DE); Andre Lehmann, Salzkotten (DE)

(73) Assignee: dSPACE digital signal processing and control engineering GmbH, Rathenaustr, Paderborn (DE)

( * ) Notice: Subject to any disclaimer, the term of this patent is extended or adjusted under 35 U.S.C. 154(b) by 652 days.

(21) Appl. No.: 13/360,873

(22) Filed: Jan. 30, 2012

(65) Prior Publication Data

US 2013/0030720 A1    Jan. 31, 2013

(30) Foreign Application Priority Data

Jul. 26, 2011    (DE) .................. 20 2011 050 806 U

(51) Int. Cl.
*G01M 17/06*    (2006.01)
(52) U.S. Cl.
CPC ..................................... *G01M 17/06* (2013.01)
(58) Field of Classification Search
CPC ............ G01M 17/065; G01M 13/025; G01M 13/027; G01M 17/00; G01M 17/007; G01M 17/06; B62D 6/008; G06F 3/016; G06F 17/5095; G05B 13/042; B60C 19/00; B60C 23/061; B06C 99/006; B60T 2270/86
USPC ......... 702/41; 701/41, 36; 703/2, 8; 318/649; 73/118.01
See application file for complete search history.

(56) References Cited

U.S. PATENT DOCUMENTS

| | | | | |
|---|---|---|---|---|
| 4,286,684 A * | 9/1981 | Berg | ............................. | 180/404 |
| 5,044,956 A * | 9/1991 | Behensky et al. | ............... | 434/45 |
| 5,828,972 A * | 10/1998 | Asanuma et al. | ............... | 701/41 |
| 2003/0055546 A1 * | 3/2003 | Demerly et al. | ................ | 701/42 |
| 2005/0087388 A1 * | 4/2005 | Turner et al. | .................. | 180/446 |
| 2006/0156803 A1 * | 7/2006 | Lee | ................. | 73/146 |
| 2007/0288142 A1 * | 12/2007 | Maeda et al. | ................... | 701/41 |

OTHER PUBLICATIONS

Yeh et al., Development of a Test Bench for Tuning and Validating Electric Power Steering Control Method, 2007 IEEE, pp. 618-622.*
HEV HIL-Simulator by dSPACE, Embedded Success, dSpace GmbH, Technologiepark 25, 33100 Paderborn, Application E-Drive Team, Copyright 2008 (12 pages).

(Continued)

*Primary Examiner* — Toan Le
(74) *Attorney, Agent, or Firm* — Orrick Herrington & Sutcliffe, LLP

(57) ABSTRACT

A steering test stand has a first steering device with a measurement unit measuring the steering device torque value and applies forces to the steering device and control unit and has a control unit connected to a computer for controlling actuators. The computer simulates static and/or dynamic properties of a motor vehicle and transmits simulated target values to the control unit. A test driver unit comprises a second steering device as a force feedback steering wheel and a connection between the test driver unit and the computer, transmits a second steering angle set on the force feedback steering wheel. A second connection between the test driver unit and computer transmits steering torque measured on the first steering device to the test unit, such that the second steering device sets a second steering torque value on the force feedback steering wheel as a function of the first value.

21 Claims, 3 Drawing Sheets

(56) References Cited

OTHER PUBLICATIONS

Dipl.-Inform. Mihai Kocsis, Prof. Dr. Klaus-D. Leimbach, Prof. Dr. Ansgar Meroth, Hochschule Heilbronn: "Integration eines Fahrsimulators in einen In-The-Loop-Prüfstand für die Entwicklung von Steer-by-Wire-Systemen" (with English machine translation).

T. Herfeld et al., "HiL-Simulation für die Entwicklung von Lenksystemen", DMecS, Development of Mechatronic Systems, GmbH & Co. KG, Gottfried-Hagen-Straße 20, D-51105 Köln (with English machine translation).

dSPACE Magazin Jan. 2010, dSPACE GmbH, Paderborn, Germany—info@dspace.com (with English machine translation).

Klotz: "Hand betätigter Lenkungstprüfstand", http//www.klotz.de/de/kfz_lenkungen/lenkungs_pruefsand_hand.html (with English machine translation).

"Lenkungsprüfstand" der of carts GmbH, http://carts.micronova.de.hardware-in-the-loop/lenkungspruefstand.html (with English machine translation).

\* cited by examiner

SYSTEMS AND METHODS FOR TESTING A STEERING CONTROL UNIT INCLUDING A TEST STAND

CROSS REFERENCE TO RELATED APPLICATION

The present invention claims priority to German Patent Application No. 20 2011 050 806.4 filed on Jul. 26, 2011, which is herein incorporated by reference.

FIELD OF THE INVENTION

The field of the invention relates generally to automotive systems. In particular, the present invention is directed to steering test stands.

BACKGROUND OF THE INVENTION

Steering test stands such as those described, for example, at the website carts.micronova.de/hardware-in-the-loop/lenkungspruefstand.html comprise a steering device consisting of a steering system or a portion of a steering system with a steering gear, a steering assistance and a steering control unit for controlling the steering assistance.

In addition, steering test stands comprise drives, e.g., gear rod drives and/or steering machines for applying forces or torques to the steering gear and/or adjusting a steering angle on the steering device. The drives comprise actuators and converters for controlling the actuators. Such a steering test stand additionally comprises a driving simulator with a control unit for controlling the drives and/or their converters and a computer unit equipped with a program for simulating static and/or dynamic properties of a motor vehicle. The computer unit transmits simulated targets for the drives and/or converters to the control unit. An actual steering angle measured on the steering device is included in the simulation.

For test purposes the steering control unit is connected to the computer unit. The steering control unit is tested for proper functioning by means of the simulation of driving maneuvers, calculation of corresponding signals on a real-time-capable computer unit and the corresponding application of external forces and/or torques via the drives.

A steering test stand in which a driver's steering is input manually via a steering wheel is described at klotz.de/de/kfz_lenkungen/lenkungs_pruefstand_hand.html This steering test stand does not have a steering machine but instead the steering device is equipped with a manually operated steering wheel. The steering forces to be applied are imparted to the test subject haptically. However, this test stand is not equipped with a computer unit for simulating realistic driving maneuvers.

A use of a force feedback steering wheel in simulating vehicle dynamics is described in the document "Integration of a driving simulator into an in-the-loop steering test stand developing steer-by-wire systems" tecday.de/files/4._tecday_meroth.pdf. In this document, a steering system is simulated and the calculated steering torque is imparted to a test driver unit by the force feedback steering wheel. The force feedback steering wheel comprises a force feedback motor which is controlled by means of suitable converters and the steering torque is built up on the steering wheel. However, the system described here is not equipped for testing a real steering system with a steering control unit.

BRIEF SUMMARY OF THE INVENTION

An apparatus and method of an improved steering test stand is disclosed.

According to one embodiment of the present invention, the steering test stand has a first steering device. The first steering device comprises a steering gear, a steering assistance and the control unit to be tested, which is equipped to control the steering assistance. A measurement device which is designed to measure a first value of a steering torque and an actual steering angle on the first steering device is provided on the first steering device. The steering test stand additionally has a first drive connected to the steering gear for applying a force or a torque to the steering gear and a second drive connected to the first steering device and configured to adjust a first steering angle on the first steering device according to a target steering angle. The steering test stand additionally comprises a control unit coupled to the first drive and the second drive and a first computer unit coupled to the control unit and equipped with a program for simulating static and/or dynamic properties of a motor vehicle. The first computer unit receives the actual steering angle measured by the measurement device and transmits simulated or predetermined target values for controlling the first drive and/or the second drive to the control unit.

According to one aspect of the invention, a test driver unit with a second steering device in the form of a force feedback steering wheel is provided. A first connection is provided between the test driver unit and the control unit and is designed to transmit a second steering angle set on the force feedback steering wheel and/or a steering angular velocity occurring on the force feedback steering wheel to the control unit. A second connection is provided between the test driver unit and the measurement device and is configured to transmit the first value of the steering torque measured on the first steering device from the measurement device to the test driver unit. The force feedback steering wheel in the test driver unit is configured to set a second value of a torque as a function for the first value.

According to another embodiment of the present invention, a method for testing a steering control unit by a steering test stand is provided. The steering test stand has a first steering device comprising a steering gear, a steering assistance and the steering control unit that is to be tested and is equipped to control the steering assistance. A measurement device is provided on the first steering device. A first value of a steering torque and an actual steering angle on the first steering device are measured by this measurement device. The steering test stand additionally has a first drive coupled to the steering gear, such that by means of the first drive a force or a torque is applied to the steering gear. The steering test stand also has a second drive coupled to the first steering device, such that a first steering angle is set on the first steering device according to a target steering angle by the second drive. The steering test stand comprises a control unit coupled to the first drive and the second drive and a first computer unit coupled to the control unit. The first computer unit is equipped with a program for simulating static and/or dynamic properties of a motor vehicle. The actual steering angle measured by the measurement device is received by the first computer unit and simulated target values for the first drive and/or the second drive are transmitted to the control unit.

According to a further embodiment of the present invention, a test driver unit is provided with a second steering device in the form of a force feedback steering wheel. A first coupling is provided between the test driver unit and the control unit by which a second steering angle set on the force feedback steering wheel is transmitted as the target steering angle and/or a steering angular velocity occurring on the force feedback steering wheel is transmitted to the control unit. The first value of the steering torque measured on the first steering device is transmitted to the test driver unit via a second coupling between the test driver unit and the measurement device, such that a second value of the steering torque is set on the second steering device in the test driver unit as a function of the first value.

Providing a test driver unit and a method for testing a steering control unit, such that the torque actually occurring is not transmitted via a mechanical connection but instead is transmitted via a data or signal transmission link reduces the risk of injury. Such a risk exists in particular when high forces act on the steering system and there is a resulting extremely rapid rotation of the steering wheel which is force-connected to the first steering device. In accordance with one aspect of the invention, the hands of the test driver can be protected from injury to the fingers or from skin abrasions on his hands by the mechanically isolated test driver unit.

In accordance with another aspect of the invention, the second value is identical to the first value if the amount of the first value does not exceed a predetermined threshold value. The threshold is selected so that it represents an upper limit for the first value of a steering torque so that in transmission of the steering torque, measured on the first steering device to the second steering device by an identical second value, minimizes the risk of injury for the test. If the contribution of the first value exceeds the threshold value, then a substantially lower value—such as the threshold value—is set on the force feedback steering wheel.

The test driver unit may also have a driver's seat and a gas pedal and/or a brake. The gas pedal and/or the brake is/are coupled to the first computer unit so that settings of the gas pedal or the brake such as their angle settings are transmitted to the computer unit. The test driver unit comprises a second computer unit and a display screen connected to the second computer unit. The second computer unit may be coupled to the first computer unit and may be configured to display results simulated on the first computer unit, for example a simulated trip distance or illustrations of an instrument panel of an automobile on the display screen on the first computer unit, such that the displays on the instrument panel are predetermined by the simulation results.

This gives the test driver a more realistic driving feeling.

In another embodiment, the test driver unit and the first steering device are configured as mechanically isolated units. This facilitates conveyance. The first steering device and the test driver unit may be set up in different rooms. For starting operation of the steering test stand, all that is needed is suitable data exchange connections.

The required size of the individual rooms may be smaller than the required size of a room that would have to accommodate both a first steering device and also a test driver unit. In addition, no steering device falls into the field of vision of the test driver in the room containing the test driver unit so that a vehicle is simulated more realistically.

In one embodiment the first steering device has a steering column such that the second drive is coupled to the steering column.

In an exemplary embodiment, the steering gear is a gear rack steering with a steering rack such that a force is applied to the steering gear by the first drive via the steering rack.

In another exemplary embodiment the steering gear is a spindle steering with a threaded spindle so that a torque is applied to the steering gear by the first drive via the threaded spindle.

The program may include at least one subprogram which is configured to modify physical variables of the first steering device in the simulation and/or to simulate mechanical defects in the first steering device, e.g., excessive play in the teeth of the steering rack. For example, a steering with greater feedback forces or a different steering ratio is simulated. This makes it possible to avoid the complicated replacement of mechanical parts when a control unit is being tested for a new type of steering.

The drive may be designed as linear motors or as rotary motors or as spindle lift cylinder motors.

The steering control unit may be an electronic power steering (EPS) or an electronic hydraulic power steering (EHPS) or a hydraulic power steering (HPS) control unit and the first steering device comprises a steering assistance unit in the form of a superimposed steering, an EPS, EHPS or HPS motor.

It should also be pointed out that in one embodiment of the invention, the steering device is reduced to the control unit and the steering assistance (e.g., EPS motor) and only one single drive is provided. In this embodiment the single drive applies a steering torque to the steering assistance according to a steering angle set on the test driver unit with the second steering device. And the single drive applies to the steering assistance a force and/or a torque according to a force simulated on the first computer unit and/or a torque simulated on the first computer unit acting on a simulated steering gear.

BRIEF DESCRIPTION OF THE DRAWINGS

The accompanying drawings, which are included as part of the present specification, illustrate an embodiment of the invention, and, together with the general description given above and the detailed description of the embodiment given below, serve to explain and teach the principles of the present invention.

The steering test stand is explained below on the basis of the exemplary embodiments in conjunction with the schematic drawing. Circuit parts having the same function are provided with the same reference numerals. In the drawings.

DETAILED DESCRIPTION OF THE INVENTION

Figure 1:
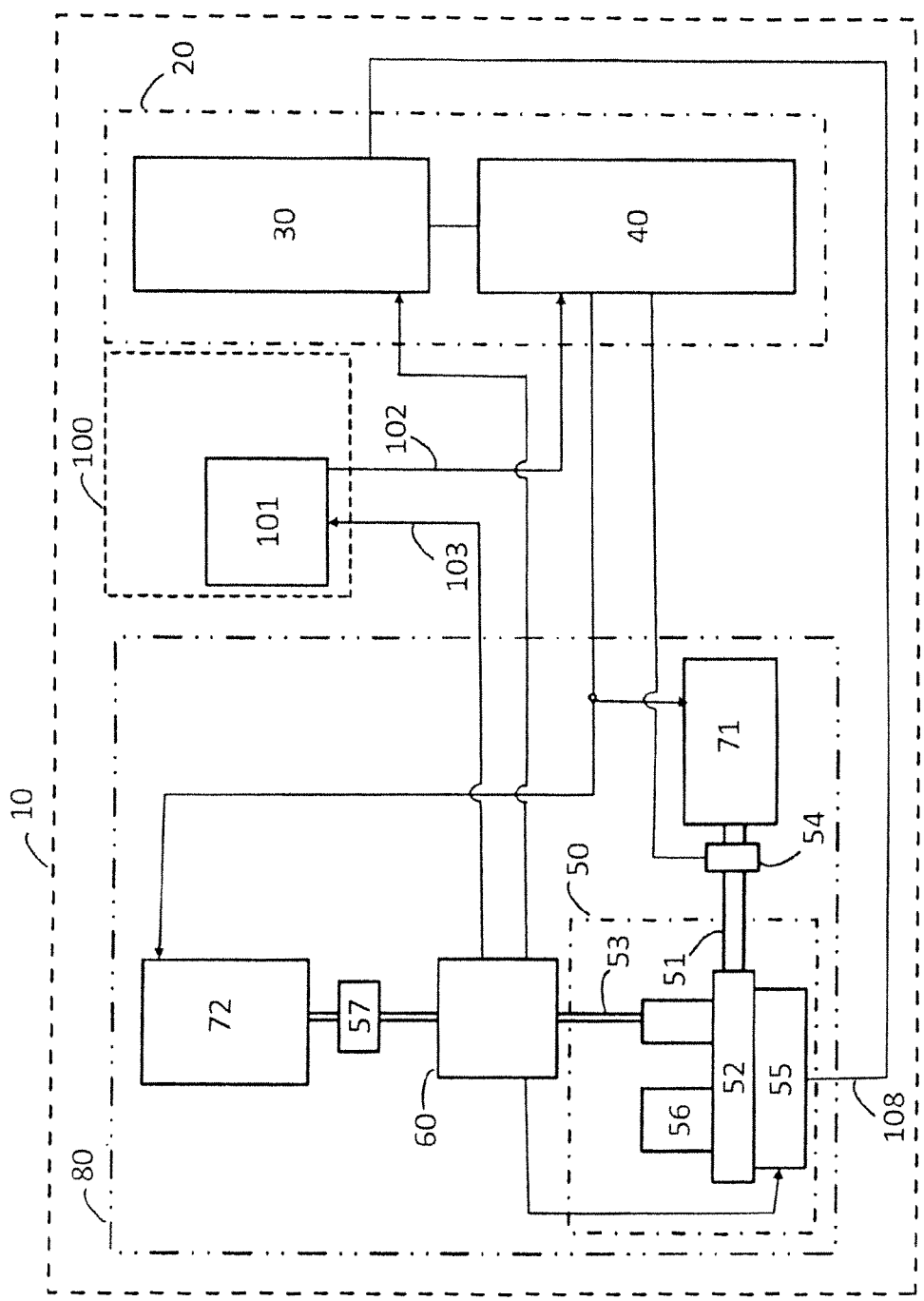
FIG. 1 shows a first schematic block diagram of a first exemplary embodiment of the inventive steering test stand.

Referring to FIG. 1, steering test stand 10 is shown with a mechanical test stand 80, a driving simulator 20 and an inventive test driver unit 100.

The mechanical test stand 80 comprises a first steering device 50 with a steering gear 52, a steering rack 51, a steering column 53, a tie rod, a steering control unit 55 to be tested and a steering assistance unit 56 in the form of a servo motor or an EPS motor which is controlled by the steering control unit 55. A measurement device 60 for measuring a first value of a steering torque and an actual steering angle and/or an actual angular velocity is provided on the steering column 53 of the first steering device 50. The first value detected is transmitted to the test driver unit 100 via a connection. In addition, the test stand 80 has, for example, a first drive 71 as a steering rack drive in the form of a linear motor, a rotor motor or a spindle lift motor. The first drive 71 serves to apply forces to the first steering device 50, i.e., the steering gear 52 in particular via the steering rack 51, the size of these forces being calculated by a program for a driving simulation model. In this embodiment the first drive 71 is configured as a steering rack drive. The program is executed on a first computer unit 30 in the driving simulator 20.

A second drive 72 in the form of a steering machine applies a steering torque to the first steering device 50, in particular, the steering column 53, by setting a target steering angle. The first steering device 50 is provided with catch couplings 54 and 57.

The catch couplings 54 and 57 are connected to a control unit 40 and serve to protect the components of the first steering device 50 from excessive forces due to the first drive 71 or the second drive 72.

The driving simulator 20 comprises the first computer unit 30 which is equipped with a program for stimulating static and/or dynamic properties of the motor vehicle and/or a vehicle environment. The program calculates forces acting on the steering rack 51 and calculates the steering torque applied to the first steering device 50 and/or the steering column 53, taking into account the actual steering angle measured by the measurement device 60 and transmitted to the first computer unit 30. The first computer unit 30 is coupled to a control unit 40. The first computer unit 30 is designed to transmit calculated and predetermined variables as target values for the control of the first drive 71 and/or the second drive 72 to the control unit 40.

The control unit 40 is coupled to the first drive 71 and to the second drive 72, for example, via an LVDS (low voltage differential signaling) connection and controls the first drive 71 and the second drive 72 via suitable converters.

A second steering device 101 in the form of a force feedback steering wheel may be provided in the test driver unit 100. The input variable for the simulation program is the actual steering angle measured on measuring device 60. The actual steering angle is transmitted from the measurement device 60 to the first computer unit 30 via a suitable connection. Between the test driver unit 100 and the control unit 40 first connection 102 is provided to transmit to the control unit 40 for the control of the second drive 72 the second steering angle set on the force feedback steering wheel 101 as the target steering angle and/or to transmit a steering angular velocity occurring on the force feedback steering wheel 101. The first connection 102 may also lead via the first computer unit 30.

Between the test driver unit 100 and the measurement device 60 second connection 103 is provided, configured to transmit the first value of the steering torque measured on the first steering device 50 to the test driver unit 100. The second steering device 101 in the test driver unit 100 is configured to set a second value of a steering torque on the force feedback steering wheel 101 as a function of the first value. The second connection 103 may also lead via the driving simulator 20 and/or via the control unit 40 and/or the first computer unit 30.

Figure 2:
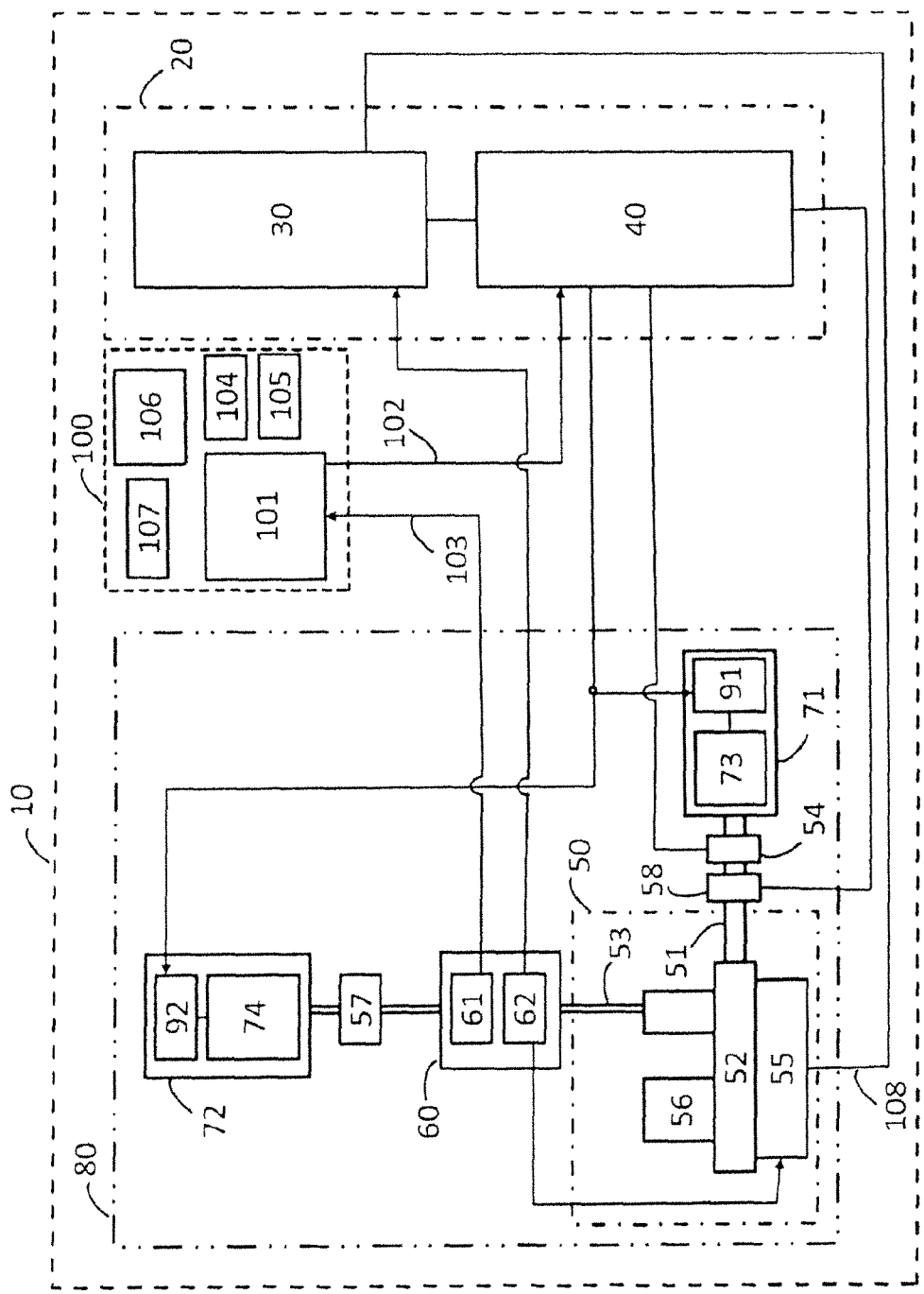
FIG. 2 shows a second detailed schematic block diagram of a first exemplary embodiment of the inventive steering test stand according to FIG. 1.

Referring now to FIG. 2 another embodiment of the steering test stand is shown. Only features which differ from those in FIG. 1 are described below.

The mechanical test stand 80 has a sensor device 58 which is coupled to the control unit 40 and is configured to detect information with respect to the acceleration and/or end positioning monitoring and/or the path. The information with regard to acceleration and/or the end position monitoring and/or the path is transmitted via the coupling between the sensor device 58 and the control unit 40.

In addition, a connection 108 between the control unit 55 and the first computer unit 30 is shown for exchange of signals. A torque measurement shaft 61 and a rotary transducer 62 are provided as the measurement device 60 for measuring the first value of the steering torque and the actual steering angle on the first steering device 50. The control unit 55 receives information about the measured actual steering angle from the rotary transducer 62 via a connection.

In addition, the design of the first drive 71 and of the second drive 72 will be explained in greater detail. The first drive 71 comprises a first converter 91 for controlling a first actuator 73 and the second drive 72 comprises a second converter 92 for controlling a second actuator 74.

In the test driver unit 100, a gas pedal 104 and a brake 105 are provided for more realistic simulation of the driving dynamics for a test driver. The gas pedal 104 and the brake 105 are coupled to the first computer unit 30 so that setting of the gas pedal 104 or the brake 105 are transmitted to the first computer unit 30. The test driver unit 100 also has a second computer unit 106 and a display screen coupled to the second computer unit 106. The second computer unit 106 is coupled to the first computer unit 30 and is designed to display simulation results simulated on the first computer unit 30 for example, a virtual landscape or illustrations of instrument panels on the display screen, such that displays on the instrument panels are predetermined by simulation results. This imparts a more realistic driving sensation to the test driver.

In addition, an input means 107 which is coupled to the second computer unit 106 in the test driver unit 100 and serves to facilitate the driver in user input to the second computer unit 106 is provided in the test driver unit 100. The input means 107 is embodied in particular as a joystick and is preferably used for remote control of the first computer unit 30 for the purpose of driving maneuver control.

Figure 3:
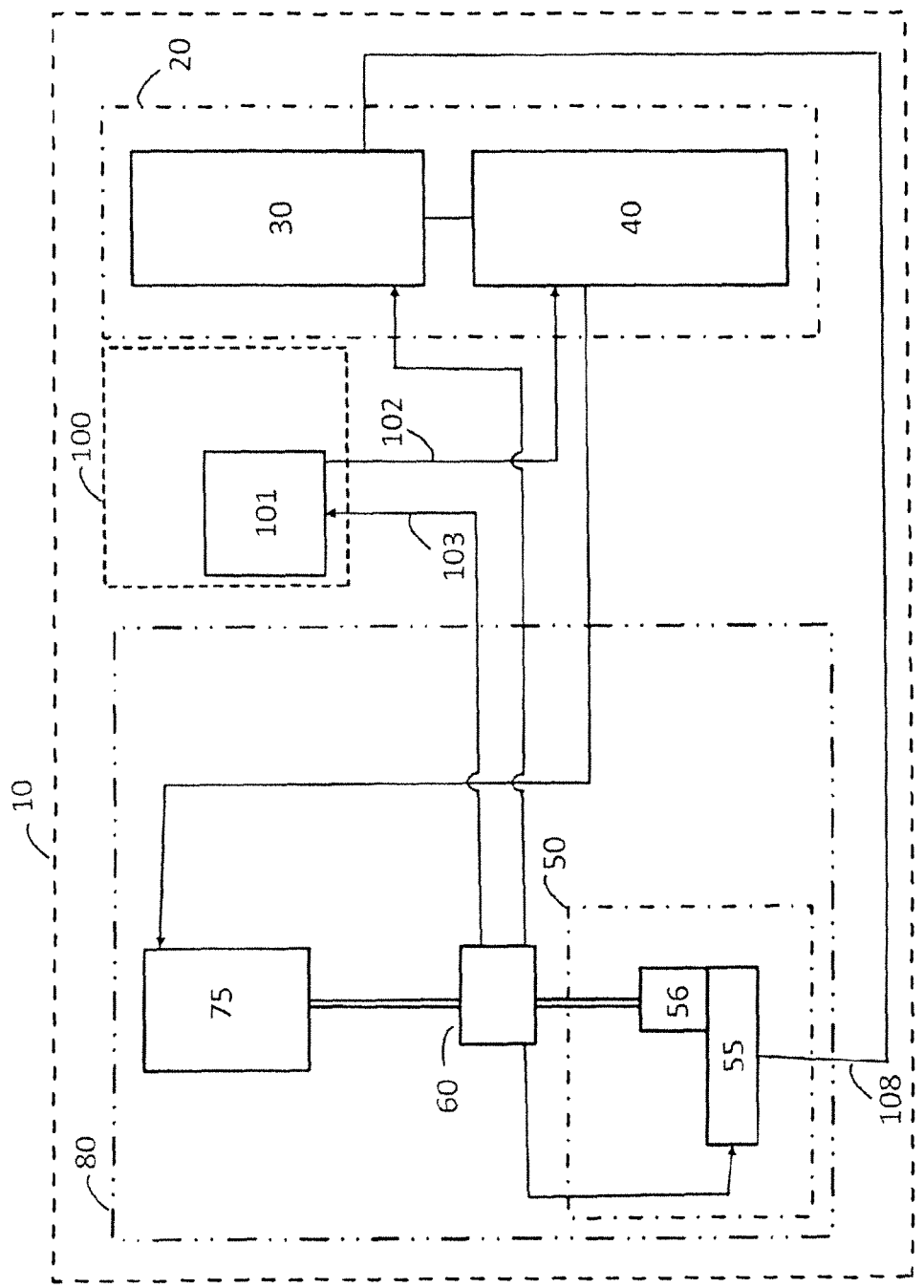
FIG. 3 shows another minimalistic embodiment of the inventive steering test stand.

FIG. 3 shows another embodiment of the invention. Only the features which differ from those in FIG. 1 are described below.

The first steering device 50 in this embodiment is reduced to the control unit 55 which is to be tested and a steering assistance unit 56 connected thereto for example, in the form of an EPS motor. In addition, a single drive 75 which is coupled to the steering assistance 56 and is configured for applying of force or torque to the steering assistance 56 and setting a first steering angle according to a target steering angle on the steering assistance 56 is also provided. The target specifications for the force to be applied and/or the torque to be applied are calculated by the first computer unit 30. The target steering angle is given by the second steering angle set on the second steering device 101.

What is claimed:

1. A steering test stand for testing a steering control unit comprising:
   a first steering device comprising:
      a steering gear;
      a steering assistance unit having an interface to receive control from the steering control unit to be tested;
   a measurement device configured to measure a first value of a steering torque on the first steering device and an actual steering angle on the first steering device;
   a first drive motor coupled to the steering gear for applying a force or a torque to the steering gear; and
   a second drive motor coupled to the first steering device, configured for setting a first steering angle on the first steering device according to a target steering angle;
   a control unit coupled to the first drive motor and the second drive motor;
   a first computer unit coupled to the control unit including a program for simulating static and/or dynamic properties of a motor vehicle, wherein the first computer unit is configured to receive the actual steering angle measured by the measurement device and to transmit simulated target values for the first drive motor and/or the second drive motor to the control unit; and wherein a test driver unit includes a second steering device in the form of a force feedback steering wheel; and wherein a first coupling is provided between the test driver unit and the control unit, and is configured to transmit a second steering angle, which is set on the force feedback steering wheel as the target steering angle and/or a steering angular velocity occurring on the force feedback steering wheel to the control unit; and wherein a second coupling is provided between the test driver unit and the measurement device, which is configured to transmit the first value of the steering torque measured on the first steering device to the test driver unit; and wherein the second steering device in the test driver unit is configured to set a second value of the steering torque as a function of the first value of the steering torque.

2. The steering test stand according to claim 1, wherein the second value of steering torque is substantially the same as the first value when the amount of the first value does not exceed a predetermined threshold and the amount of the second value is lower than the amount of the first value when the amount of the first value exceeds the predetermined threshold.

3. The steering test stand according to claim 1, wherein the test driver unit comprises a driver's seat and has a gas pedal and/or a brake wherein the gas pedal and/or the brake is connected to the first computer unit so that settings in the gas pedal and/or the brake are transmitted to the first computer unit.

4. The steering test stand according to claim 1, wherein the test driver unit has a second computer unit and a display screen coupled to the second computer unit, wherein the second computer unit is coupled to the first computer unit and is configured to display simulation results simulated on the first computer unit and/or to illustrate an instrument panel on the display screen.

5. The steering test stand according to claim 1, wherein the test driver unit and the first steering device are designed as mechanically isolated units.

6. The steering test stand according to claim 1, wherein the program has a subprogram which is designed to modify physical variables of the first steering device in a simulation and/or to simulate mechanical defects in the first steering device.

7. The steering test stand according to claim 1, wherein the first steering device has a steering column and the second drive motor is coupled to the steering column wherein the second drive motor serves as a steering machine.

8. The steering test stand according to claim 1, wherein the first drive motor is a linear motor or a rotary motor or a spindle lift cylinder motor.

9. The steering test stand according to claim 1, wherein the steering gear is a gear rack steering with a gear rack or a spindle steering with a threaded spindle so that a force is applied to the steering gear by the first drive motor via the toothed drive or a torque is applied to the steering gear by the first drive motor via the threaded spindle.

10. The steering test stand according to claim 1, wherein the steering control unit is an EPS (electronic power steering) or EHPS (electronic hydraulic power steering) or HPS (hydraulic power steering) control unit and the first steering device comprises an EPS or an EHPS or an HPS motor.

11. A method for testing a steering control unit by a steering test stand wherein the steering test stand includes a first steering device comprising, a steering assistance unit wherein the steering control unit to be tested is equipped to control the steering assistance unit; a measurement device; a drive motor connected to the steering assistance unit; a control unit coupled to the drive motor; and a first computer unit comprising a program for simulating static and/or dynamic properties of a motor vehicle and coupled to the control unit; and the method for testing comprising:

measuring by use of the measurement device, a first value of a steering torque on the first steering device, and measuring an actual steering angle on the first steering device;

receiving by the first computer unit the actual steering angle measured by the measurement device and simulating by use of the program for simulation target values for the drive motor and transmitting the target values to the control unit and applying via the drive motor a force or a torque calculated by the first computer unit to the steering assistance unit; and setting via the drive motor, a first steering' angle according to a target steering angle on the steering assistance unit and providing a test driver unit including a second steering device in the form of a force feedback steering wheel and transmitting via a first connection provided between the test driver unit and the control unit a second steering angle set on the force feedback steering wheel as the target steering angle and/or a steering angular velocity occurring on the force feedback steering wheel to the control unit, and providing a second connection between the test driver unit and the measurement device by means of which the first value of the steering torque measured on the first steering device is transmitted to the test driver unit such that a second value of a steering torque is set on the second steering device in the test driver unit as a function of the first value.

12. A method for testing a first steering control unit by a steering test stand, wherein the steering test stand comprises a first steering device comprising a steering gear; a steering assistance unit wherein, the steering control unit to be tested is equipped to control the steering assistance unit; a measurement device; a first drive motor connected to the steering gear; a second drive motor connected to the first steering device; a control unit connected to the first drive motor and the second drive motor; a first computer unit connected to the control unit and equipped with a program for simulation of static and/or dynamic properties of a motor vehicle; and the method for testing comprising:

measuring on the first steering device a first value of a steering torque and an actual steering angle, and receiving by the first computer unit the actual steering angle measured by the measuring device and transmitting to the control unit target values for the first drive motor and/or the second drive motor simulated by using the program for simulation of static and/or dynamic properties of a motor vehicle and applying a force or torque to the steering gear via the first drive motor; and setting a first steering angle according to a target steering angle on the first steering device via the second drive motor;

providing a test driver unit comprising a second steering device in the form of a force feedback steering wheel and providing a first connection between the test driver unit and the control unit and transmitting a second steering angle set on the force feedback steering wheel as the target steering angle and/or a steering angular velocity occurring on the force feedback steering wheel to the control unit, and providing a second connection between the test driver unit and the measurement device by means of which the first value of the steering torque measured on the first steering device is transmitted to the test driver unit such that a second value of a steering torque is set on the second steering device in the test driver unit as a function of the first value.

13. The method according to claim 11, wherein, the second value is equated with the first value if the amount of the first value does not exceed a predetermined threshold and the amount of the second value is set lower than the amount of the first value if the amount of the first value exceeds the predetermined threshold.

14. The method according to claim 11, wherein, the program has a subprogram so that physical variables of the first steering device are modified in the simulation and/or mechanical defects of the first steering device are simulated.

15. A steering test stand used for testing a steering control unit of a motor vehicle steering system having a steering column and a steering assistance unit, the steering test stand comprising:
(a) a measurement device having
  (i) a measurement input that is configured to be coupled to the motor vehicle steering system being tested, and
  (ii) a measurement output that is configured to output
    (1) a measured steering torque value applied to the motor vehicle steering system being tested, and
    (2) a measured actual steering angle of the motor vehicle steering system being tested;
(b) a computer unit coupled to the measurement output and configured to generate properties of a simulated motor vehicle unit based on the measured steering torque value and the measured actual steering angle received from the measurement output and to output simulated target values;
(c) a drive motor configured to be
  (i) couplable to the steering assistance unit of the motor vehicle steering system being tested, and
  (ii) capable of setting a steering angle on the steering assistance unit and capable of applying a force or torque to the steering assistance unit;
(d) a control unit coupled to the computer unit and the drive motor and configured to receive the simulated target values from the computer unit and control the drive motor in accordance with the simulated target values; and
(e) a test driver steering unit including a force feedback steering wheel,
wherein the test driver steering unit is coupled to the measurement output and the control unit and configured to transmit inputs to the control unit and receive the measured steering torque value from the measurement device, and
wherein the test driver steering unit is further configured to use the measured steering torque value to set an applied steering torque value on the force feedback steering wheel, such that the applied steering torque value is a function of the measured steering torque value.

16. The steering test stand according to claim 15, wherein the applied steering torque value is substantially the same as the measured steering torque value when the amount of the measured steering torque value does not exceed a predetermined threshold and the amount of the applied steering torque value is lower than the amount of the measured steering torque value when the amount of the measured steering torque value exceeds the predetermined threshold.

17. The steering test stand according to claim 15, wherein the test driver steering unit comprises a driver's seat and has a gas pedal and/or a brake wherein the gas pedal and/or the brake is connected to the computer unit so that settings in the gas pedal and/or the brake are transmitted to the computer unit.

18. The steering test stand according to claim 15, wherein the test driver unit has a second computer unit and a display screen coupled to the second computer unit, wherein the second computer unit is coupled to the computer unit and is configured to display simulation results simulated on the computer unit and/or to illustrate an instrument panel on the display screen.

19. The steering test stand according to claim 15, wherein the test driver steering unit is mechanically isolated from the steering assistance unit, the steering column and the steering control unit.

20. The steering test stand according to claim 15, wherein the program has a subprogram which is designed to modify physical variables of the steering device under test in a simulation and/or to simulate mechanical defects in the steering device under test.

21. The steering test stand according to claim 15, wherein the steering control unit is an EPS (electronic power steering) or EHPS (electronic hydraulic power steering) or HPS (hydraulic power steering) control unit and the first steering device comprises an EPS or an EHPS or an HPS motor.

* * * * *